Nov. 1, 1966 D. A. MacLEOD 3,283,083
TELEPHONE SUBSCRIBER'S LINE CIRCUIT
Filed March 13, 1963
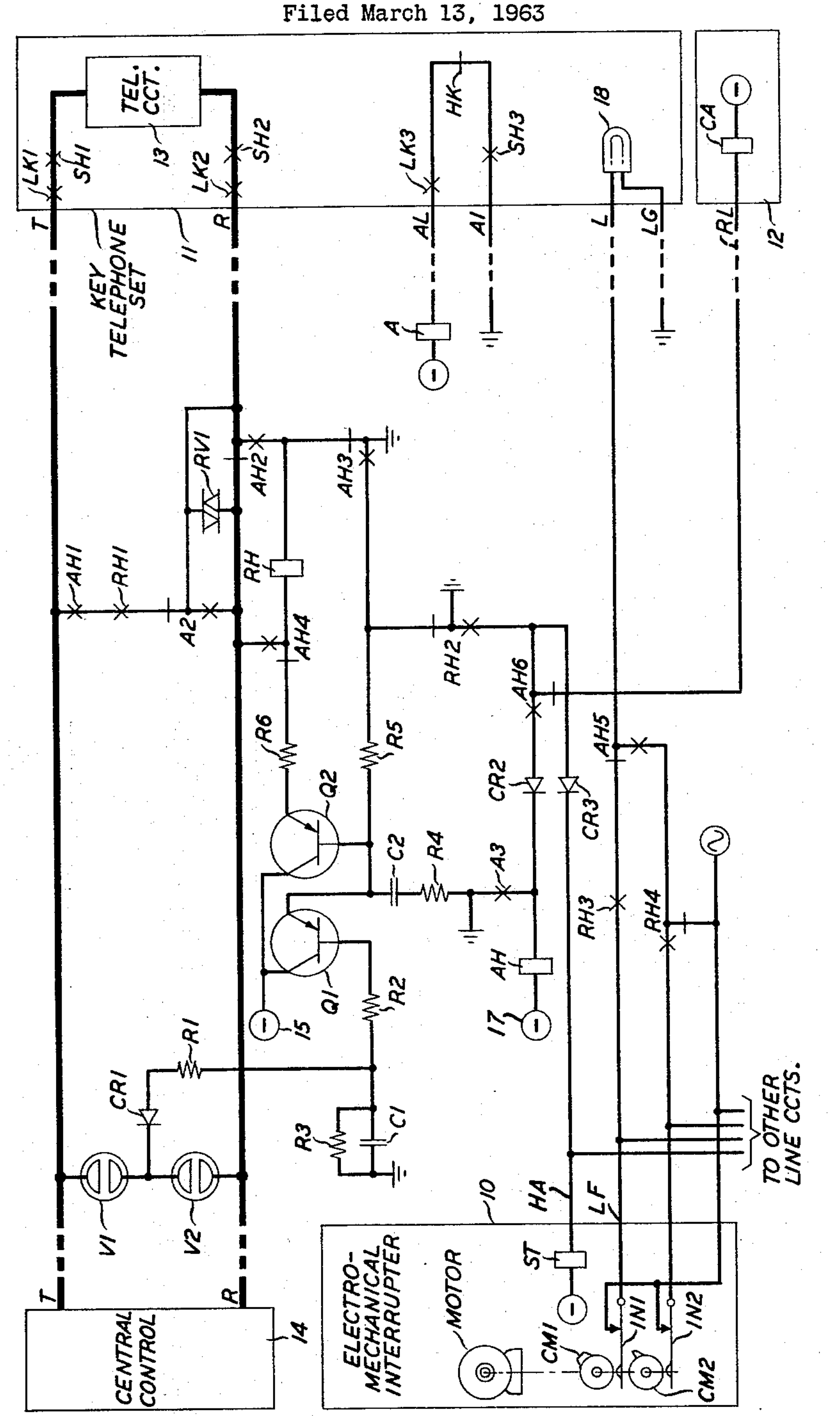
INVENTOR
D. A. MAC LEOD
BY E. J. Olinder
ATTORNEY

United States Patent Office 3,283,083

Patented Nov. 1, 1966

3,283,083

TELEPHONE SUBSCRIBER'S LINE CIRCUIT

Donald A. MacLeod, Oakland, Calif., assignor to American Telephone and Telegraph Company, New York, N.Y., a corporation of New York Filed Mar. 13, 1963, Ser. No. 264,829

8 Claims. (Cl. 179—99)

This invention relates to telephone systems and more particularly to the type of control facilities known generally as telephone line circuits. The general object of the invention is to simplify telephone line circuits.

Telephone line circuits are employed to perform various control and supervisory functions incident to the establishment of a connection between a common switching point such as a central office or PBX and one or more telephone sets at a subscriber's premises. In the case of a line circuit serving a plurality of telephone sets in a key telephone system, for example, the functions typically performed include signaling a particular subscriber station in response to a central office or PBX ringing signal, holding that line in response to manual key operation by the subscriber, indicating by means of visual or audible signals whenever a line is being called, held or busy, timing out visual and audible signals when an incoming call is not answered and originating and holding outgoing calls.

Line circuits find such extensive use in the telephone plant that cost is necessarily a prime consideration and any reduction in the complexity of such circuits, as by a reduction in the number of circuit devices or components, for example, may be reflected in a substantial overall reduction in cost. Known attempts in the prior art to effect such savings have been successful only at the expense of a reduction in circuit versatility or at the expense of circuit reliability, or both.

Accordingly, a specific object of the invention is to reduce the number of components required in telephone line circuits without sacrificing reliability or flexibility of performance, thereby to minimize line circuit installation and maintenance costs.

Another object of the invention is to reduce the power requirements of telephone line circuits thereby to permit the utilization of relatively low impedance circuit devices and longer loop lengths.

These and other objects are achieved in accordance with the principles of the invention by a telephone line circuit for a key telephone system wherein both the initiation and cut-off of local ringing are made directly responsive to central office ringing by employing rectified ringing current to control the state of conduction of a transistor circuit which in turn controls a relay that performs a multiple function as a ringing control device and as a line holding device. In accordance with the invention the dual purpose relay, when performing the "hold" function, is connected directly across the telephone line and since its impedance is specifically designed to match that of the subscriber's set, the need for a conventional holding bridge network is obviated.

Accordingly, one feature of the invention is a telephone line circuit in a key telephone system which employs transistor controlled relays to effect visual or audible signaling to indicate the supervisory state of the circuit and also to effect time-out of local ringing.

Another feature of the invention is the employment in a telephone line circuit of the type described of a transistor controlled dual function relay which controls local ringing and visual signaling in one operating sequence and which effects the line holding function in another operating sequence.

Another feature of the invention is the utilization of a multifunction relay in a telephone line circuit in lieu of a conventional holding bridge network.

The principles of the invention, together with additional objects and features thereof may be fully comprehended from the following detailed description of an illustrative embodiment and from the accompanying drawing in which:

The single figure is a schematic circuit diagram of a telephone line circuit embodying the features of the invention.

In the figure a subscriber's key telephone set 11, illustrative of one of the sets of a key telephone system in accordance with the invention, is shown connected to a central control station 14, which may be a PBX or central office, by way of conventional T and R leads. Connection to the line is controlled by relays AH and RH. A third relay A, whose operation is controlled by line key contacts LK3, switchhook contacts SH3 and hold key contacts HK, in turn controls the operation of control transistors Q1 and Q2 which govern the operation of relays AH and RH. A conventional electromechanical interruptor unit 10 is employed to control the signaling of line lamp 18 and the ringer of the common audible circuit 12 through contacts of relays AH and RH. The precise interrelation among the key circuit devices indicated as well as the function of additional cooperatively related circuit elements may be readily ascertained from the following description of the major circuit functions and operating sequences.

*Incoming call*

Conventional A.-C. ringing current is received over either the T or R lead from the central control facility 14 which, as indicated above, may be a PBX or distant central office. Negative voltage peaks of the ringing current are passed by neon lamp V1 or V2, depending upon the connection of the T and R leads at central control 14, and thence by way of diode CR1 and resistor R1 are applied to charge capacitor C1. The resulting negative potential on capacitor C1 is also applied to the base of transistor Q1 by way of resistor R2, causing transistor Q1 to conduct which in turn charges capacitor C2 from negative power supply 15, the source of bias for collectors of both transistors Q1 and Q2. When transistor Q1 conducts, a negative potential is also applied to the base of transistor Q2, causing it to conduct. As a result, relay RH operates over a path which extends from negative power supply 15 through the collector emitter path of transistor Q2, resistor R6, break contacts AH4 of relay AH, the windings of relay RH, break contacts AH3 and thence to ground.

At the end of the ringing interval capacitor C1 discharges through resistor R3, allowing transistor Q1 to cut off. The charge on capacitor C2 keeps transistor Q2 in the conducting state for some additional preselected period, which may be on the order of 6 seconds for example, which effectively serves to bridge the so-called "silent interval." At the end of this time if ringing has been discontinued, relay RH releases and ground is again applied to resistor R5 by way of a path which includes break contacts RH2 of relay RH. The completion of the path described serves to discharge capacitor C2 completely.

During the period described above, when relay RH is operated, the HA lead is grounded by way of make contact RH2 which completes a path for the operation of start relay ST of interruptor 10. Interruptor 10 is shown in bare schematic outline form, inasmuch as such equipment is wholly conventional. Motor M drives cams CM1 and CM2 which in turn operate contacts IN1 and IN2. Such an arrangement is conventionally employed to effect the selection of the desired interruption rates for both visual and audible signaling and also to apply steady current for such signaling under certain preselected conditions. In the arrangement illustrated, interruptor unit 10 applies interrupted or flashing lamp power on lead LF by way of make contact RH3, break contact AH5 and lead L to line lamp 18. Relay RH, operated, also applies ground by way of make contact RH2, break contact AH6 and lead RL to relay CA of the common audible circuit 12 which supplies local ringing.

*Call answered*

When the local key telephone set 11 is answered and taken off-hook, the loop is completed through make contacts LK1 and LK2 of the line key, through switchhook contacts SH1 and SH2 and through telephone circuit 13. Relay A is made to operate over a path which extends from ground over lead A1, switchhook contact SH3, hold key break contact HK, line key make contact LK3, and lead AL. The operation of relay A completes a path for the operation of slow release relay AH which extends from ground over make contact A3 through the windings of relay AH and thence to power source 17. The operating path of relay AH also provides a discharge path for capacitor C2 and the operation of make-break contacts AH5 transfers the L lead to a source of steady lamp power supplied over a path which includes contacts IN2, break contact RH4 and make contact AH5. Additionally, the operation of relay AH transfers the winding of relay RH from the emitter circuit of transistor Q2 to ring lead R in preparation for its use as a hold relay. The isolation of relay RH from the emitter base circuit of transistor Q2 is accomplished by the operation of break contacts AH3 and AH4. Relay RH releases when its winding is shorted out by the completion of the circuit path which includes make contact AH4, make contact A2 and make contact AH2.

*Outgoing call*

In making an outgoing call, relays A and AH operate in exactly the same sequence as set forth in the description of the "Call Answered" function immediately above.

*Line holding*

With relays A and AH operated on an established call, the operation of the hold-key break contact HK opens the operating path of relay A and relay A releases. The release of relay A results in the release of relay AH by opening the operating path of relay AH at make contact A3. Additionally, the shorting path of relay RH, described above, is opened by the release of make contacts AH2, AH4 and A2, which allows relay RH to operate in series with the loop. Relay RH provides a holding ground for relay AH by way of make contact RH2 before relay AH can release and transfers the L lead from steady power to lamp wink. Relay RH also places a short across the T and R leads to the station, thereby locking itself to the line loop. The hold condition is released by the station reseizing the line and grounding the A lead. The A relay then operates, which replaces the short across the winding of relay RH, causing relay RH to release.

Varistor RV1 is provided to prevent false operation of relay RH which may occur as the result of switching transients caused by normal hang-up.

It is to be understood that the circuit described herein is merely illustrative of the principles of the invention. A wide variety of modifications thereto may be effected by persons skilled in the telephone art without departing from the spirit and scope of the invention.

What is claimed is:

1. In a line circuit for a key telephone system including a subscriber's telephone line and a telephone set connected thereto, local signaling means, means responsive to ringing current from a remote location for initiating the operation of said local signaling means, circuit means responsive to the termination of said ringing current after a predetermined interval of time following said termination for disabling said local ringing means and means for holding said subscriber's line, said initiating means and said holding means each including a common multifunction relay connectable across said telephone line, the impedance of said relay being substantially equivalent to the impedance of said telephone set, thereby avoiding any requirement for a holding bridge network as a part of said line holding means.

2. In a line circuit for a key telephone system, local ringing means, means responsive to a ringing current from a remote location for initiating operation of said local ringing means, line holding means including a relay connectable across said telephone line, said relay also forming a part of said initiating means, said initiating means including means for rectifying said ringing current, means including a capacitor for building up an electrical charge of a preselected level in response to the flow of current from said rectifying means, circuit interruptor means including a source of local ringing current, and means responsive to the build-up of an electrical charge to said preselected level by said capacitor for establishing a first current path between said interruptor and said local ringing means, thereby to operate said local ringing means.

3. Apparatus in accordance with claim 2, wherein said initiating means further includes a first transistor having a base circuit, a collector circuit and an emitter circuit, said first transistor being switched from a nonconducting to a conducting state by the application of a voltage of said preselected level to said base circuit thereof, whereupon current is caused to flow in said emitter and collector circuits thereof, a control circuit including said relay, said control circuit having a normally uncompleted operating path, means responsive to the flow of current in said collector circuit for completing said operating path, whereupon said relay operates to complete said first current path.

4. Apparatus in accordance with claim 3 wherein said operating path completing means includes a second transistor responsively operative to the operation of said first transistor.

5. A line circuit for a key telephone system which system includes at least one subscriber line and a telephone set connected thereto, said line circuit comprising local ringing means, telephone line circuit interruptor means including a source of local ringing current, means including a first relay for completing a current path between said interruptor means and said ringing means, means including first and second transistors operatively responsive to the application of ringing current to said line circuit from a remote location, said first relay being operatively responsive to the operation of said transistors, means for holding said telephone line including said first relay and further including means for bridging said first relay across said telephone line, said telephone set including switchhook contacts, line key contacts and hold key contacts and means including a second relay having an operating path which includes said switchhook contacts, said line key contacts and said hold key contacts for isolating said first relay from said transistors during the line holding function.

6. In a key telephone system, in combination, a relatively distant centralized control point, a telephone set, a telephone line connectable between said control point and said telephone set, local ringing means, local visual signaling means, local interruptor means, a first relay, means for rectifying ringing current applied to said line from said control point, means including first and second transistors operatively responsive to rectified ringing current for completing an operating path for said first relay, means including contacts on said first relay and said interruptor means for supplying interrupted operating current to said local ringing means and to said local visual signaling means, a second relay, said telephone set including switchhook contacts, hold key contacts and line key contacts, the operating path of said second relay including said switchhook contacts, said line key contacts and said hold key contacts, whereby said second relay is made operative as said telephone is moved off-hook, a third relay responsive to the operation of said second relay, means including contacts on said third relay for isolating said local ringing means from a current source and for shifting said operating current supplied to said visual signaling means from interrupted current to steady current, means including said hold key contacts for releasing said second relay, for isolating said first relays from said transistors and for connecting said first relay directly across said telephone line, the impedance characteristics of said first relay being substantially identical to the impedance characteristics of said set as viewed from said control point thereby obviating the need for the insertion of a separate hold circuit in said line during the performance of the hold function.

7. In a key telephone system a central control station, a key telephone set, a telephone line connectable between said station and said line, a telephone line circuit comprising, in combination, a first power source, first and second transistors normally biased to an OFF condition by said power source, means for rectifying ringing current applied to said line and for applying said current so rectified to said first transistor thereby to turn said first transistor ON, said second transistor being shifted from OFF to ON upon the turning ON of said first transistor, local ringing means, local visual signaling means, a local source of alternating current, an interruptor, a first relay having an operating path extending from said first power source through said second transistor, means including contacts on said first relay for initiating the operation of said interruptor, for supplying power to said local ringing means and for supplying interrupted current from said local source of alternating current to said visual signaling means, said telephone set including switchhook contacts, hold key contacts and line key contacts, a second relay having an operating path including said hold key contacts, said line key contacts and said switchhook contacts whereby said second relay operates upon the operation of said switchhook contacts and said line key contacts, means including a third relay responsive to the operation of said second relay for isolating said first relay from said transistors, means including said second relay responsive to the release of said first relay upon the operation of said hold key contacts for connecting said first relay directly across said telephone line whereby said first relay is made to serve as a line holding pad.

8. In a key telephone system, in combination, a central control station, a key telephone set, a telephone line connectable between said station and said set, a relay including a coil, local ringing means, means including a transistor responsive to ringing current applied to said line from said central control station for operating said relay thereby to initiate the operation of said local ringing means, said telephone set including hold key contacts, and means responsive to the operation of said hold key contacts for connecting said coil across said line thereby effecting the holding of said line.

No references cited.

KATHLEEN H. CLAFFY, *Primary Examiner.*

WILLIAM C. COOPER, *Examiner.*